United States Patent
Yoon et al.

(10) Patent No.: US 11,448,423 B2
(45) Date of Patent: Sep. 20, 2022

(54) HOT LIQUID GENERATION MODULE FOR LIQUID TREATMENT APPARATUS

(71) Applicant: LG ELECTRONICS INC., Seoul (KR)

(72) Inventors: Heesang Yoon, Seoul (KR); Jongjin Park, Seoul (KR); Sangki Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 16/607,292

(22) PCT Filed: Apr. 6, 2018

(86) PCT No.: PCT/KR2018/004054
§ 371 (c)(1),
(2) Date: Oct. 22, 2019

(87) PCT Pub. No.: WO2018/199498
PCT Pub. Date: Nov. 1, 2018

(65) Prior Publication Data
US 2020/0378650 A1    Dec. 3, 2020

(30) Foreign Application Priority Data
Apr. 25, 2017 (KR) .................. 10-2017-0052732

(51) Int. Cl.
*F24H 1/10* (2022.01)
*F24H 9/00* (2022.01)
(Continued)

(52) U.S. Cl.
CPC ............. *F24H 1/105* (2013.01); *F24H 9/001* (2013.01); *F24H 9/0021* (2013.01);
(Continued)

(58) Field of Classification Search
None
See application file for complete search history.

(56) References Cited

U.S. PATENT DOCUMENTS 1,188,952 A  *  6/1916  Laird .................. F24H 1/102
                                                    392/493
1,519,395 A  *  12/1924  Clench ................ F24H 1/102
                                                    392/493
(Continued)

FOREIGN PATENT DOCUMENTS

JP      2013-134880     7/2013
KR   10-2008-0026143    3/2008
(Continued)

OTHER PUBLICATIONS

Indian Office Action dated Aug. 24, 2020 issued in Application No. 201917044878.
(Continued)

*Primary Examiner* — Thor S Campbell
(74) *Attorney, Agent, or Firm* — Ked & Associates, LLP (57) ABSTRACT

Provided is a hot water generation module for a water treatment apparatus. The hot water generation module for the water treatment apparatus includes a ceramic heater in which at least one heating wire is disposed and which has a hollow tube shape, a housing disposed to surround the outside of the ceramic heater, and a heating passage of which at least a portion is disposed in the housing to surround an outer circumferential surface of the ceramic heater in a spiral shape and in which raw water introduced into the housing is discharged to the outside of the housing after heating the raw water to generate hot water by coming into contact with the ceramic heater.

15 Claims, 7 Drawing Sheets

(51) Int. Cl.
*F24H 9/20* (2022.01)
*H05B 3/44* (2006.01)
*G01K 13/02* (2021.01)
*G05D 7/06* (2006.01)
*C02F 1/00* (2006.01)

(52) U.S. Cl.
CPC .......... *F24H 9/2028* (2013.01); *G01K 13/02* (2013.01); *G05D 7/0647* (2013.01); *H05B 3/44* (2013.01); *C02F 1/001* (2013.01); *C02F 2209/02* (2013.01); *G01K 13/026* (2021.01)

(56) References Cited

U.S. PATENT DOCUMENTS

| | | | | |
|---|---|---|---|---|
| 1,634,704 A * | 7/1927 | Brand | ............. | F24H 1/102 392/493 |
| 1,671,677 A * | 5/1928 | Keeton | ............. | F24H 1/142 392/489 |
| 1,688,796 A * | 10/1928 | Baker | ............. | F24H 1/102 392/398 |
| 2,215,587 A * | 9/1940 | Kerschbaum | ........ | H05B 3/148 338/237 |
| 2,280,977 A * | 4/1942 | Reichmann | ......... | H05B 3/44 338/234 |
| 3,584,194 A * | 6/1971 | Kautz | ............. | B05B 9/002 392/484 |
| 3,643,733 A * | 2/1972 | Hall | ............. | F28F 9/0219 165/81 |
| 3,835,294 A * | 9/1974 | Krohn | ............. | F24H 1/121 392/484 |
| 4,286,140 A * | 8/1981 | Dewulf | ............. | F24H 9/2014 165/156 |
| 4,395,618 A * | 7/1983 | Cunningham | ......... | H05B 3/82 165/160 |
| 4,465,922 A * | 8/1984 | Kolibas | ............. | F24H 1/121 165/156 |
| 4,480,172 A * | 10/1984 | Ciciliot | ............. | H05B 3/42 392/396 |
| 4,563,571 A * | 1/1986 | Koga | ............. | H05B 3/42 219/543 |
| 4,975,559 A * | 12/1990 | Frisch | ............. | A47J 31/542 392/449 |
| 5,441,710 A * | 8/1995 | Marois | ............. | B01D 45/16 392/485 |
| 7,248,792 B2 * | 7/2007 | Mihara | ............. | A61C 1/0069 392/492 |
| 7,458,807 B2 * | 12/2008 | Alfoldi | ............. | F28D 7/026 431/11 |
| 7,756,404 B2 * | 7/2010 | Schubert | ............. | F28D 7/026 392/478 |
| 8,731,386 B2 * | 5/2014 | Waechter | ............. | F24H 9/0015 392/479 |
| 9,014,548 B2 * | 4/2015 | Jang | ............. | B60H 1/2221 392/465 |
| 9,803,886 B2 * | 10/2017 | Chang | ............. | F24H 1/121 |
| 10,051,991 B2 * | 8/2018 | Blanc | ............. | B23P 15/00 |
| 2007/0143914 A1 * | 6/2007 | Shirai | ............. | F24H 9/1818 4/420.2 |
| 2011/0036544 A1 | 2/2011 | Shirai et al. | | |
| 2012/0103968 A1 * | 5/2012 | Lu | ............. | F24H 1/225 219/429 |
| 2014/0050466 A1 * | 2/2014 | Giffels | ............. | H05B 3/22 392/488 |
| 2017/0074545 A1 | 3/2017 | Klein | | |
| 2018/0031270 A1 | 2/2018 | Kim et al. | | |
| 2019/0195530 A1 * | 6/2019 | Liao | ............. | F24H 9/0021 |

FOREIGN PATENT DOCUMENTS

| | | |
|---|---|---|
| KR | 10-2011-0008627 | 1/2011 |
| KR | 10-2012-0065850 | 6/2012 |
| KR | 10-2013-0141200 | 12/2013 |
| KR | 10-1564263 | 10/2015 |
| KR | 10-2016-0099154 | 8/2016 |

OTHER PUBLICATIONS

International Search Report dated Nov. 20, 2018 issued in Application No. PCT/KR2018/004054.
Korean Office Action dated Oct. 29, 2021 issued in Application No. 10-2017-0052732.

* cited by examiner

Streamline

CFD Results (type A)

[Fig. 11]

CFD Results (type B)

HOT LIQUID GENERATION MODULE FOR LIQUID TREATMENT APPARATUS

CROSS-REFERENCE TO RELATED PATENT APPLICATIONS

This application is a U.S. National Stage Application under 35 U.S.C. § 371 of PCT Application No. PCT/KR2018/004054, filed Apr. 6, 2018, which claims priority to Korean Patent Application No. 10-2017-0052732, filed Apr. 25, 2017, whose entire disclosures are hereby incorporated by reference.

TECHNICAL FIELD

The present disclosure relates to a hot water generation module for a water treatment apparatus.

BACKGROUND ART

In general, water purifiers are devices in which raw water is purified by a filter or a membrane and then stored in a storage container, and the purified water stored in the storage container as described above is dispensed so that the raw water is safely used.

In detail, water purifier for supplying water having various temperatures may be classified into water purifiers that dispense room temperature water (purified water) and cold water and cold and hot water purifiers that dispense purified water, cold water, and hot water.

Among these purifiers, the cold and hot water purifiers provide cold water or hot water when required by a user after water purified by passing through a filter unit including a plurality of filters is cooled by using a cooling unit and then stored in a storage container, or heated by using a heating unit and then stored in a storage container.

As described above, a general cold and hot water purifier includes separate storage containers for storing cold water and hot water.

For example, a cold and hot water purifier is disclosed in Korean Patent Publication No. 10-2011-0008627. The cold and hot water purifier is provided with a purified water tank in which purified water filtered by a filter part for filtering introduced raw water is stored and a cold water tank connected to the purified water tank through a connection tube to receive the purified water from the purified water tank through the connection tube by using a natural water pressure difference with respect to the purified water tank.

Also, a cold and hot water purifier or a cold and hot water device, which quickly dispenses hot water, is disclosed in Korean Patent Publication No. 10-2013-0141200. The cold and hot water purifier or the cold and hot water device is provided with a hot water tank in which water is stored, and a ceiling part is tilted at a predetermined angle with respect to a surface of the water, and a vent is defined in the highest portion of the ceiling part.

However, the cold and hot water purifier according to the related art has a limitation that an overall volume thereof increases because storage containers for storing cold water and hot water, i.e., a cold water tank and a hot water tank are necessarily used.

Also, since a pump and a water level adjustment sensor are provided due to the use of the cold water tank and the hot water tank, manufacturing costs may increase. In addition, since the hot water has to always maintained in a high-temperature state to provide the hot water, energy (power) may be unnecessarily consumed.

Figure 1:
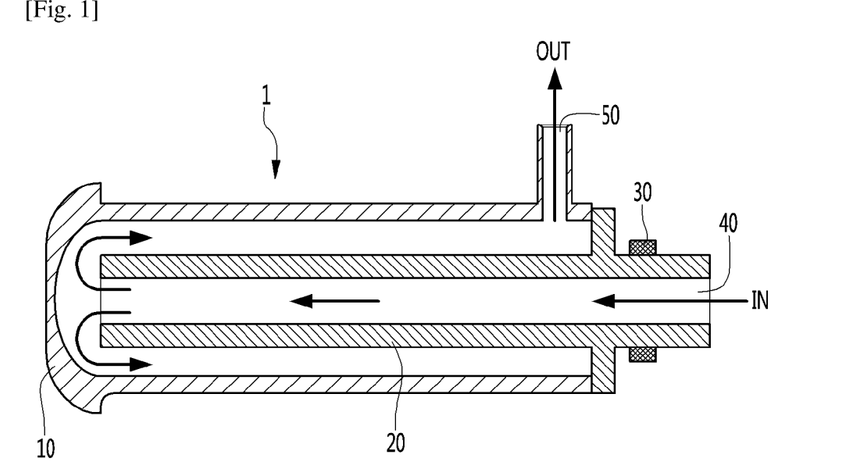
FIG. 1 is a cross-sectional view of a hot water heating device including a ceramic heater according to the related art.

FIG. 1 is a cross-sectional view of a hot water heating device including a ceramic heater according to the related art.

Referring to FIG. 1, a hot water heating device 1 is applied to various water treatment apparatuses such as water purifiers and bidets and includes a housing 10, a ceramic heater 20 mounted inside the housing 10, and a fixing member 30 fixing the ceramic heater 20 to the housing 10.

Here, the housing 10 and the ceramic heater 20 may have cylindrical shapes and be coaxially disposed with respect to each other.

Also, an inlet hole 40 communicates with the ceramic heater 20, and an outlet hole 50 communicates with the housing 10.

Thus, water introduced into the inlet hole 40 passes through the inside of the ceramic heater 20 and flows along the outside of the ceramic heater 20 and then is discharged through the outlet hole 50.

When the water flows through the inside of the ceramic heater 20, the water comes into contact with an inner wall of the ceramic heater 20 and thus is heated. When the water flows along the outside of the ceramic heater 20, the water comes into contact with an outer wall of the ceramic heater 20 and thus is heated. Then, the heated water is discharged through the outlet hole 50.

Figure 2:
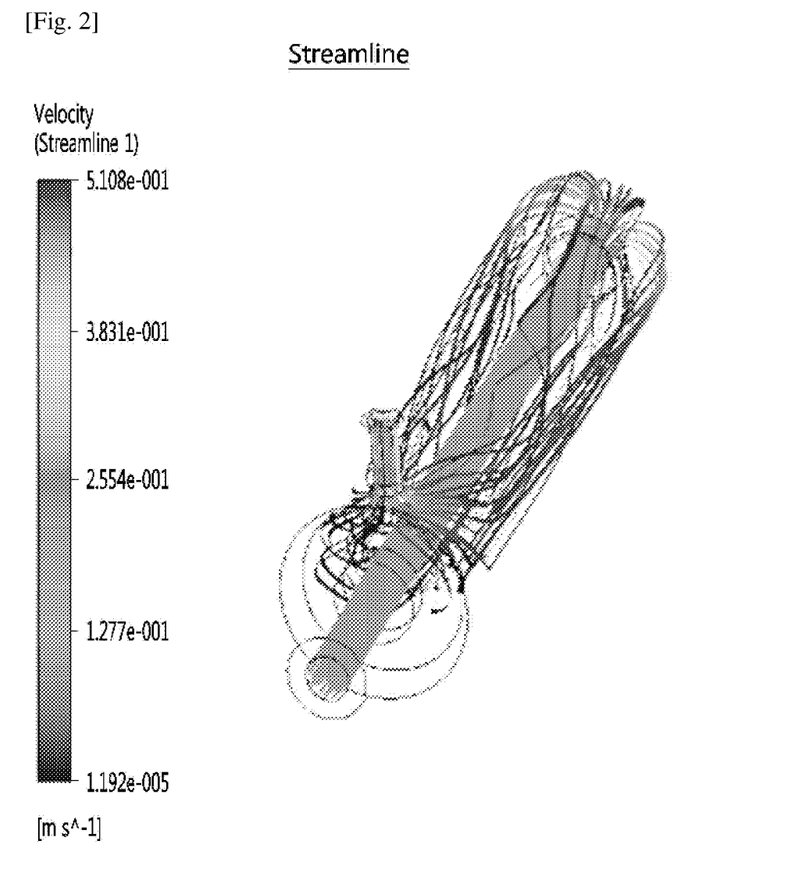
FIG. 2 is a view illustrating a flow analysis result of the hot water heating device of FIG. 1.
Figure 3:
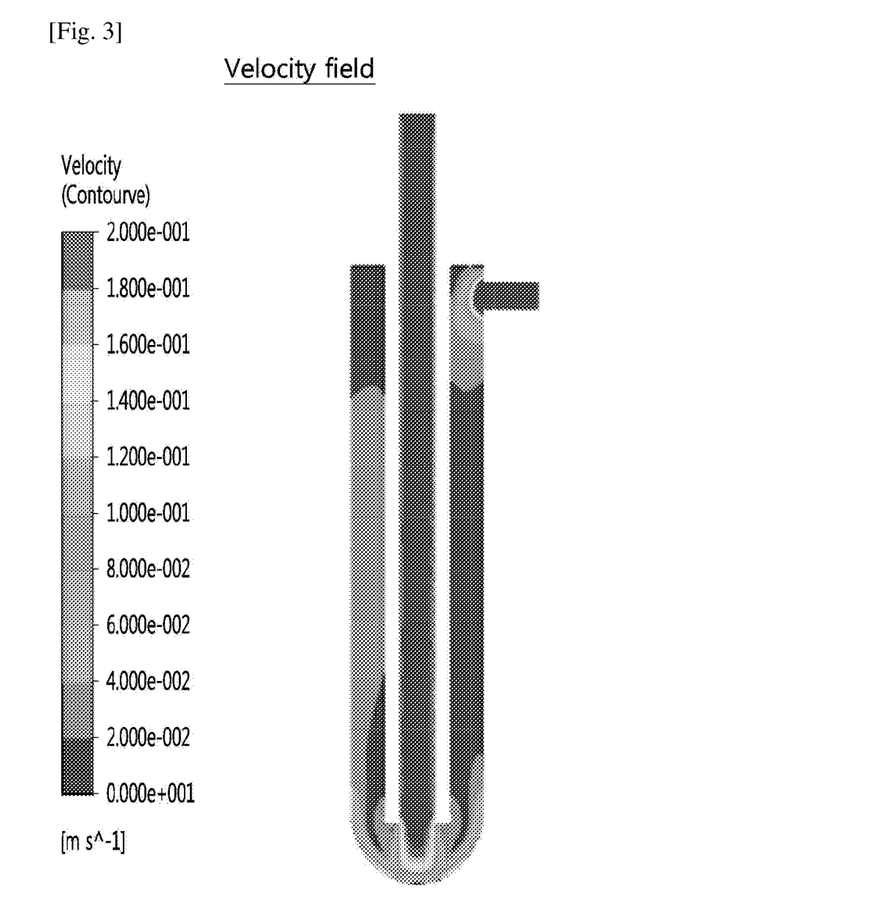
FIG. 3 is a view illustrating a flow velocity distribution result of the hot water heating device of FIG. 1.
Figure 4:
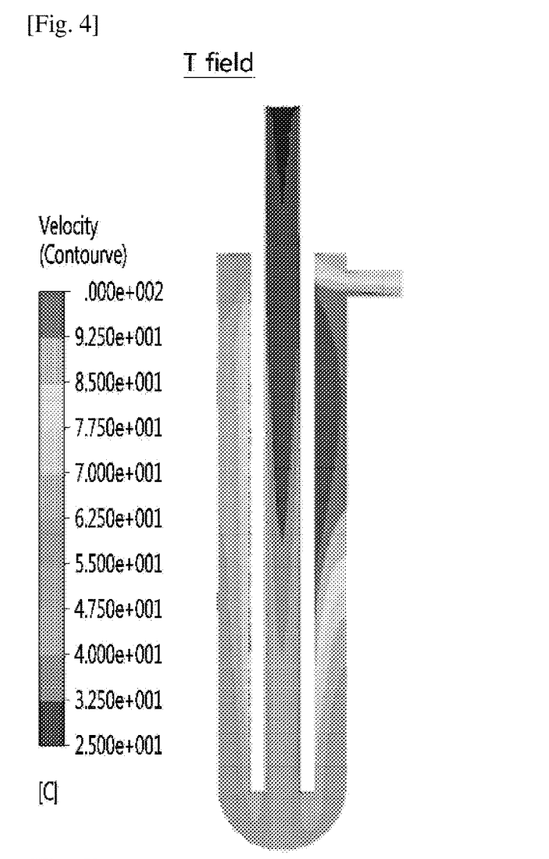
FIG. 4 is a view illustrating a temperature distribution result of the hot water heating device of FIG. 1.

FIG. 2 is a view illustrating a flow analysis result of the hot water heating device of FIG. 1, FIG. 3 is a view illustrating a flow velocity distribution result of the hot water heating device of FIG. 1, and FIG. 4 is a view illustrating a temperature distribution result of the hot water heating device of FIG. 1.

Referring to FIGS. 2 to 4, the above-described hot water heating device according to the related art has a limitation that a flow stagnant section (see dotted lines in the drawing) occurs, and boiling occurs in the flow stagnant section.

Figure 5:
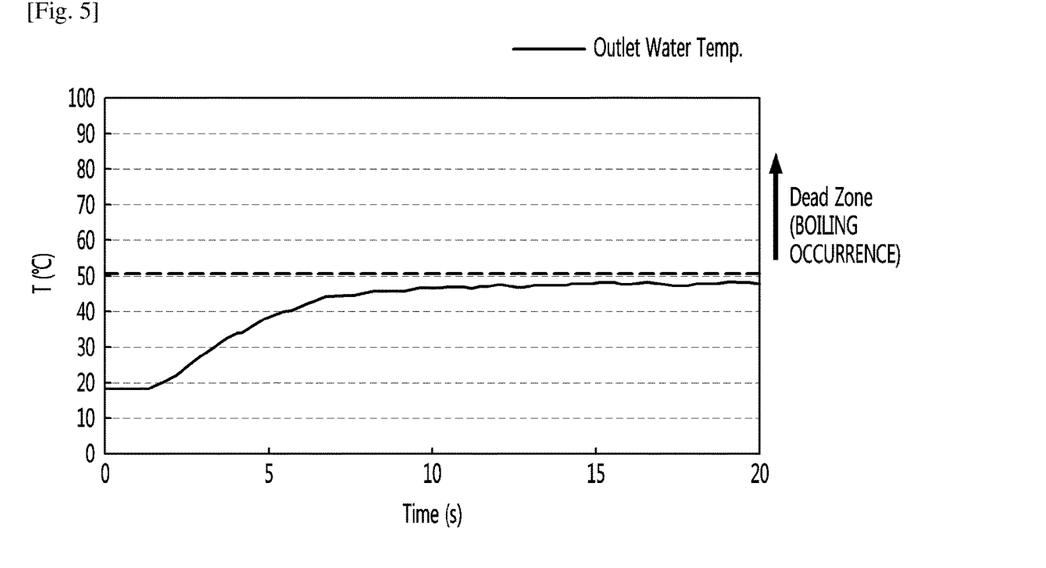
FIG. 5 is a graph illustrating a variation in temperature of hot water discharged from the hot water heating device of FIG. 1.

FIG. 5 is a graph illustrating a variation in temperature of hot water discharged from the hot water heating device of FIG. 1.

Referring to FIG. 5, in the above-described hot water heating device according to the related art, it is difficult to generate hot water having a temperature of about 50° C. or more due to the boiling phenomenon in the flow stagnant section.

That is, although the above-described hot water heating device according to the related art is applied to devices such as bidets in which hot water having a relatively low temperature is required, it is difficult to apply the hot water heating device to devices such as purifier in which hot water having a relatively high temperature (about 50° C. or more) is required.

For reference, the analysis shown in FIGS. 2 to 4 was performed under conditions in which heater power is about 1600 W, heating wall has a heat flux (about 34.9 W/cm2), an inlet water flow rate is about 8.73 g/s, and an inlet water temperature is about 25° C.

DISCLOSURE OF INVENTION

Technical Problem

Embodiments provides a hot water generation module for a water treatment apparatus, which is capable of generating hot water by instantly heating raw water as soon as dispensing of the hot water is required.

Embodiments also provide a hot water generation module for a water treatment apparatus, which is capable of reducing manufacturing costs while being miniaturized in volume because a storage container for storing hot water and a pump therefor are not provided.

Embodiments also provide a hot water generation module for a water treatment apparatus, which is capable of reducing unnecessary consumption of energy (power) because it is unnecessary to maintain hot water at a high temperature.

Embodiments also provide a hot water generation module for a water treatment apparatus, which is capable of generating hot water having a high temperature because a flow stagnant phenomenon does not occur while raw water is heated to dispense the hot water having about 85° C. or more.

Embodiments also provide a hot water generation module for a water treatment apparatus, which is capable of securing safety by solving a water boiling phenomenon because a flow stagnant phenomenon does not occur.

Embodiments also provide a hot water generation module for a water treatment apparatus, which is capable of improving the flow stagnant phenomenon to smoothly supply raw water and thereby to increase an outlet water flow rate of hot water supplied to the outside.

Embodiments also provide a hot water generation module for a water treatment apparatus, which is capable of supplying hot water having a uniform temperature because a fluid is mixed while flowing in a high-temperature low-velocity flow space defined in an outlet hole side through which the hot water having a high temperature is discharged.

Embodiments also provide a hot water generation module for a water treatment apparatus, which is capable of minimizing heat loss due to heat dissipation because hot water having a high temperature passes through a central portion of a ceramic heater.

Embodiments also provide a hot water generation module for a water treatment apparatus, in which kinetic energy is accumulated into raw water while the introduced raw water passes through a curved passage, and a rotating flow is formed in a spiral shape within the raw water by the accumulated kinetic energy even when the raw water passes through a linear passage so that the high-temperature hot water is uniformly mixed and thus dispensed at a uniform temperature.

Solution to Problem

In one embodiment, a hot water generation module for a water treatment apparatus includes: a ceramic heater in which at least one heating wire is disposed and which has a hollow tube shape; a housing disposed to surround the outside of the ceramic heater; and a heating passage of which at least a portion is disposed in the housing to surround an outer circumferential surface of the ceramic heater in a spiral shape and in which raw water introduced into the housing is discharged to the outside of the housing after heating the raw water to generate hot water by coming into contact with the ceramic heater.

The heating passage may include: a linear passage provided in a hollow shape inside the ceramic heater; a curved passage provided in a spiral shape on an outer surface of the ceramic heater; and a connection passage connecting the linear passage to the curved passage at an end of the ceramic heater.

An inlet hole communicating with the curved passage to transfer the raw water supplied from the outside to the curved passage may be defined in an upper end of one side of the housing.

The inlet hole may be defined in a tangential direction of the curved passage.

An outlet hole communicating with the linear passage and discharging the hot water, which is heated while coming into contact with the ceramic heater, to the outside may be defined in an upper end of the other side of the housing.

The outlet hole may be defined above the inlet hole.

The outlet hole may be defined in parallel to the inlet hole.

The hot water generation module may further include a flow rate adjustment unit adjusting a flow rate of the raw water introduced into the inlet hole or adjusting a flow rate of the hot water discharged through the outlet hole.

The housing may includes: a main body which has both opened sides and a hollow therein and in which an inwardly recessed groove part is defined in a spiral shape; an upper cap covering the opened one side of the main body and having an outlet hole through which a linear passage communicates with the outside; and a lower cap covering the other opened side of the main body.

A flange part protruding outward along a circumference of the ceramic heater may be disposed on one side of the ceramic heater, and the flange part may be fixed between the main body and the upper cap.

An elastic member may be disposed between the ceramic heater and the lower cap.

The elastic member may include a coil spring that gradually increases in diameter from one side thereof coming into contact with the lower end of the ceramic heater to the other side thereof coming into contact with the lower cap, and the one side of the elastic member may be accommodated in the hollow of the ceramic heater.

The main body may be manufactured in an injection molding manner.

A temperature sensor detecting a temperature of the hot water may be disposed in a hollow of the ceramic heater.

The hot water generation module may further include a control part receiving the temperature of the hot water, which is detected by the temperature sensor, and controlling an output of the ceramic heater.

The details of one or more embodiments are set forth in the accompanying drawings and the description below. Other features will be apparent from the description and drawings, and from the claims.

Advantageous Effects of Invention

According to the embodiments, the raw water may be instantly heated as soon as the dispensing of the hot water is required to generate the hot water.

Also, since the storage container for storing the hot water and the pump therefor are not provided, the manufacturing costs may be reduced while being miniaturized in volume.

Also, since it is unnecessary to maintain the hot water at a high temperature, the unnecessary consumption of energy (power) may be reduced.

Also, since the flow stagnant phenomenon does not occur while the raw water is heated, the hot water having a high temperature may be generated to dispense the hot water having about 85° C. or more.

Also, since the flow stagnant phenomenon does not occur, the water boiling phenomenon may be solved to secure the safety.

Also, since the flow stagnant phenomenon is improved as described above, the raw water may be smoothly supplied, and thus the outlet water flow rate of hot water supplied to the outside may increase.

Also, since the fluid is mixed while flowing in the high-temperature low-velocity flow space defined in an outlet hole side through which the hot water having a high temperature is discharged, the hot water having a uniform temperature may be supplied to the outside.

Also, the hot water having a high temperature may pass through the central portion of the ceramic heater to minimize the heat loss due to the heat dissipation.

Also, the kinetic energy may be accumulated into the raw water while the introduced raw water passes through the curved passage, and the rotating flow is formed in the spiral shape within the raw water by the accumulated kinetic energy even when the raw water passes through the linear passage so that the high-temperature hot water is uniformly mixed and thus dispensed at a uniform temperature.

MODE FOR THE INVENTION

Hereinafter, exemplary embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings attached to the following embodiments are embodiments of the scope of the invention, but to facilitate understanding within the scope of the present invention, in the description of the fine portions, the drawings may be expressed differently according to the drawings, and the specific portions may not be displayed according to the drawings, or may be exaggerated according to the drawings.

Figure 6:
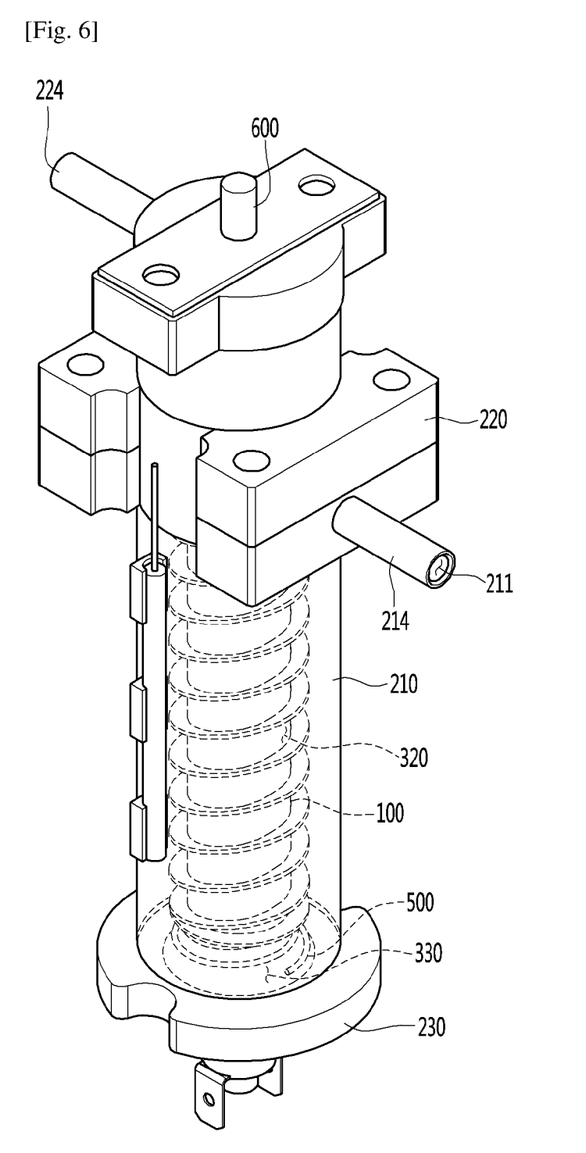
FIG. 6 is a perspective view of a hot water generation module for a water treatment apparatus according to an embodiment.
Figure 7:
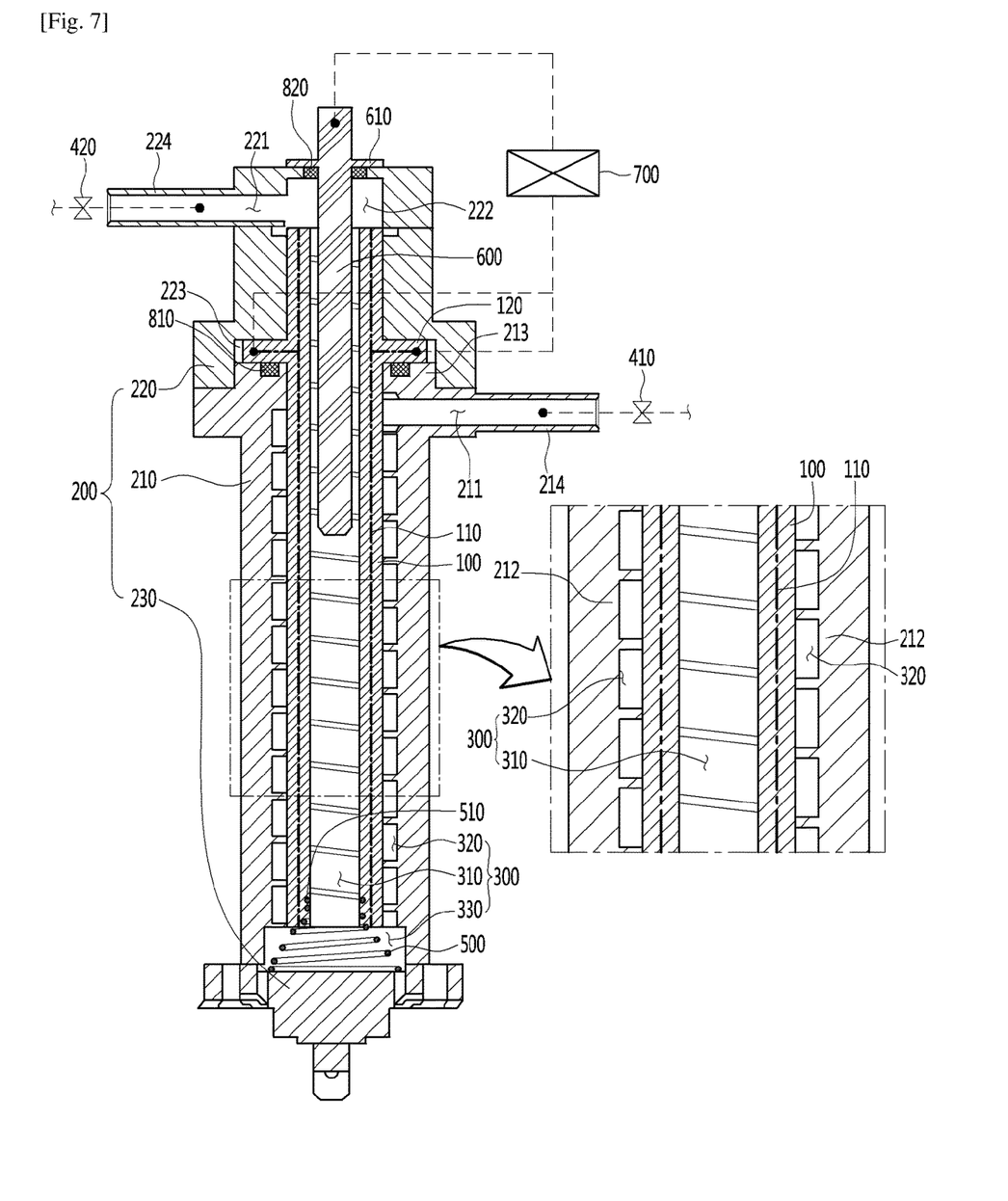
FIG. 7 is a cross-sectional view of the hot water generation module for the water treatment apparatus according to an embodiment.

FIG. 6 is a perspective view of a hot water generation module for a water treatment apparatus according to an embodiment, and FIG. 7 is a cross-sectional view of the hot water generation module for the water treatment apparatus according to an embodiment.

Referring to FIGS. 6 and 7, a hot water generation module for a water treatment apparatus includes a ceramic heater 100, a housing 200, and a heating passage 300.

First, the ceramic heater 100 may have a hollow tube shape, and at least one heating wire 110 may be disposed in the ceramic heater 100.

Here, the heating wire 110 may be inserted into the ceramic heater 100 so that the heating wire 110 is not exposed to the outside of the ceramic heater 100.

Also, the heating wire 110 is connected to an external control part 700 through an electric wire to generate heat by an output of the control part 700. When the heat is generated by the heating wire 110 as described above, the ceramic heater 100 may generate heat. For reference, the control part 700 may include an inverter adjusting an output value supplied to the heating wire 110.

Since the ceramic heater 100 has the hollow tube shape, when the ceramic heater 100 is heated by the heating wire 110, a fluid may be more surely heated while passing along the outer surface and the inner surface of the ceramic heater 100.

Also, since the ceramic heater 100 has high heat resistance, the safety of the ceramic heater 100 may be secured even when used for a long time.

For another example, known various heating units such as heating units using an induction heating manner instead of the ceramic heater 100 may be applied to the hot water generation module according to an embodiment.

The ceramic heater 100 may be accommodated in the housing 200.

In detail, a hollow part in which the ceramic heater 100 is accommodated may be defined in the housing 200. Also, an inlet hole 211 through which the raw water is introduced into the housing 200 from the outside and an outlet hole 221 through which the hot water heated in the housing 200 is discharged to the outside may be defined in the housing 200.

The raw water introduced through the inlet hole 211 may absorb heat energy of the ceramic heater 100 and thus be heated while coming into contact with the inner surface and the outer surface of the ceramic heater 100 within the housing 200, and the heated hot water may be discharged through the outlet hole 221 to the outside of the housing 200.

The hot water generation module may be applied to the water treatment apparatus such as water purifiers and bidets, which instantly generates hot water when hot water generation is required by a user. That is, the hot water generation module may not operate in a manner in which hot water is previously prepared, but operate in a manner in which hot water is instantly generated when a hot water generation command is inputted from the outside.

Here, if flow stagnant occurs in any one section of the passage provided in the housing 200 while the hot water is generated, water boiling may occur in the corresponding section.

When the above-described boiling occurs, problem in safety may occur.

Also, when the boiling occurs in the flow stagnant section, it is impossible to generate hot water having a temperature of about 50° C. or more due to safety reasons.

That is, it is difficult to apply the hot water generation module to the device such as the water purifier in which generation of hot water having a relatively high temperature (about 50° C. or more) is required.

Thus, it is necessary to form a passage so as to prevent the flow stagnant section from occurring while the hot water is generated.

In case of this embodiment, a heating passage 300 may be provided to prevent from the flow stagnant from occurring when hot water having a high temperature (about 50° C. or more) is instantly generated.

In detail, at least a portion of the heating passage 300 is disposed in the housing 200 to surround an outer circumferential surface of the ceramic heater 100 in a spiral shape.

Thus, the raw water introduced into the housing 200 may come into contact with the ceramic heater 100 while flowing along the spiral heating passage 300 and thus be heated to generate hot water. Then, the hot water may be discharged to the outside of the housing 200.

In a modified example, at least a portion of the heating passage 300 may be disposed to surround an inner circumferential surface of the ceramic heater 100 in a spiral shape.

According to an embodiment in which the heating passage 300 is provided, since the raw water introduced through the inlet hole 211 flows along the spiral heating passage 300, a streamline may be improved to prevent the flow stagnant section from occurring. Thus, since the boiling due to the flow stagnant does not occur, instant hot water generation having a high temperature (about 50° C. or more) may be enabled. In addition, the safety may be secured.

Hereinafter, the heating passage 300 will be described in more detail.

In this embodiment, the heating passage 300 may include a linear passage 310 provided in the ceramic heater 100 and having a hollow shape, a spiral curved passage 320 provided on the outer surface of the ceramic heater 100, and a connection passage 330 connecting the linear passage 310 to the curved passage 320 at an end of the ceramic heater 100.

Thus, the raw water introduced into the housing 200 may come into contact with the outer surface of the ceramic heater 100 while passing along the curved passage 320 and come into contact with the inner surface of the ceramic heater 100 while passing along the linear passage 310 and thus be heated.

Here, design factors such as a curvature, a height H, a distance T, and a thickness D of the curved passage 320 may be variously changed according to various requirements such as an outlet water flow rate, an outlet water temperature, a hot water generation rate, and an installation space.

Also, a path of the fluid passing through the heating passage 300 may be variously implemented according to various embodiments.

For example, the raw water introduced into the housing 200 through the inlet hole 211 may pass through the linear passage 310 and then pass through the curved passage 320 via the connection passage 330 and be disposed to the outside of the housing 200 through the outlet hole 221.

For another example, the raw water introduced into the housing 200 through the inlet hole 211 may pass through the curved passage 320 and then pass through the linear passage 310 via the connection passage 330 and be disposed to the outside of the housing 200 through the outlet hole 221.

Here, a water inlet tube 214 protruding outward may be disposed on an upper end of one side of the housing 200, and an inlet hole 211 may be defined in the water inlet tube 214. Also, the inlet hole 211 may communicate with the curved passage 320, and the raw water introduced into the inlet hole 211 through the water inlet tube 214 may be supplied first to the curved passage 320.

Also, the inlet hole 211 may be defined in a tangential direction of the curved passage 320.

In detail, the inlet hole 211 may be formed in the tangential direction of the curved passage 320 provided in the uppermost end.

When the inlet hole 211 is formed in the tangential direction of the curved passage 320 as described above, the raw water supplied into the inlet hole 211 through the water inlet tube 214 may be supplied to the curved passage 320 while undergoing minimal resistance. That is, the introduction of the raw water into the heating passage 300 may be more easily performed.

Also, a water outlet tube 224 protruding outward may be disposed on an upper end of the other side of the housing 200, and an outlet hole 221 may be defined in the water outlet tube 224. Also, the outlet hole 221 may communicate with the linear passage 310, and thus the hot water heated by the ceramic heater 100 while passing through the linear passage 310 may be discharged from the water outlet tube 224 through the outlet hole 221.

Also, the outlet hole 221 may be defined above the inlet hole 211. That is, the water outlet tube 224 may be disposed above the water inlet tube 215.

Thus, the raw water introduced into the inlet hole 211 may flow downward from an upper side along the linear passage 310, and then flow upward from a lower side along the linear passage 310 and thereby to be sufficiently heated. Then, the hot water may be discharged out of the housing 200 through the outlet hole 221.

Also, only the hot water heated at a high temperature in the heating passage 300 may be discharged to the outside through the outlet hole 221 defined above the inlet hole 211 due to a convection current phenomenon.

Also, the outlet hole 221 may be defined in parallel to the inlet hole 211. That is, the water outlet tube 224 may be disposed in parallel to the water inlet tube 215.

When the outlet hole 221 is formed in parallel to the inlet hole 211 as described above, since the water outlet tube 224 is disposed in parallel to the water inlet tube 215, the total height of the hot water generation module may be reduced.

Also, a hose connected to the water outlet tube 224 and the water inlet tube 215 may be more easily disposed.

Referring again to FIG. 7, flow rate adjustment units 410 and 420 adjusting a flow rate of the raw water introduced into the inlet hole 211 or adjusting a flow rate of the hot water discharged through the outlet hole 221 may be further provided.

Each of the flow rate adjustment units 410 and 420 may be adjusted in opened degree of an inner diameter thereof to adjust the flow rate of the raw water introduced into the inlet hole 211 or adjust the flow rate of the hot water discharged through the outlet hole 221 and also be completely closed to block a flow of the fluid.

Also, each of the flow rate adjustment units 410 and 420 may further include a flow rate sensor. Here, the flow rate adjustment units 410 and 420 may be connected to the control part 700 to supply flow rate information detected by the flow rate sensor to the control part 700. Also, the flow rate adjustment units 410 and 420 may be opened or adjusted in opened degree according to a signal outputted from the control part 700.

Hereinafter, another embodiment of the housing 200 will be described.

In this embodiment, the housing 200 may include a main body 210 which has both opened sides and a hollow therein and in which an inwardly recessed groove part 212 is defined in a spiral shape, an upper cap 220 covering the opened one side of the main body 710 and having an outlet hole 221 through which a linear passage 310 communicates with the outside, and a lower cap 230 covering the other opened side of the main body 210.

Also, the main body 210, the upper cap 220, and the lower cap 230 may be connected to each other a coupling unit such as a bolt.

According to an embodiment, since the housing 200 is provided in a separable or assemble state, it is advantageous that a ceramic heater 100 is accommodated in the housing 200, and an elastic member 500 or a temperature sensor 600, which will be described later, is easily disposed. In addition, there is an advantage that it is easy to check and repair.

Also, since the housing 200 is provided in the separable or assemble state, the main body 210, the upper cap 220, and the lower cap 230 may be manufactured in an injection molding manner.

Particularly, in case of the main body 210, since the spiral groove part 212 has to be defined in an inner circumferential surface of the main body 210, if the groove part 212 is machined in the inner circumferential surface of the main body 210 through a method such as cutting, a failure rate may increase, and productivity may decrease due to the difficulty of work. On the other hand, when the injection molding is performed, the housing 200 may be more easily manufactured, the failure rate may decrease, and the productivity may increase.

Also, when the housing 200 is provided in the separable or assemble state, the coupling to the ceramic heater 100 may be more easily performed.

For example, a flange part 120 protruding outward along a circumference of the ceramic heater 100 may be disposed on one side of the ceramic heater 100, and the flange part 120 may be fixed between the main body 210 and the upper cap 220.

In detail, a protrusion 213 protruding upward may be disposed on a central portion of an upper end of the main body 210. Also, a recess 223 recessed upward may be defined in a central portion of a lower end of the upper cap 220. Here, the protrusion 213 may be fitted into the recess 223, and the flange part 120 of the ceramic heater 100 may be inserted into and fixed between a bottom surface of the recess 223 and a top surface of the protrusion 213.

Also, a sealing member 810 for preventing water from leaking may be inserted between the flange part 120 and the protrusion 213 or the recess 223. For example, the sealing member 810 may be provided as an O-ring.

Also, a space part 222 communicating with the outlet hole 221 may be defined in an upper portion of the upper cap 220.

Thus, the hot water passing through the linear passage 310 provided in the ceramic heater 100 may be changed in direction in the space part 222 and then discharged out of the water outlet tube 224 through the outlet hole 221.

Also, an elastic member 500 may be disposed between the ceramic heater 100 and the lower cap 230.

The elastic member 500 has an upper end coming into contact with a lower end of the ceramic heater 100 to support the ceramic heater 100 and a lower end coming into contact with the lower cap 230 to support the lower cap 230. Also, the elastic member 500 may provide force that pushes the lower end of the ceramic heater 100 upward, and thus, the ceramic heater 100 may be fixed in a state of being spaced apart form the lower cap by the force.

That is, since the elastic member 500 is provided, a space may be defined between the lower end of the ceramic heater 100 and the lower cap 230 to provide a connection passage 330. Thus, the fluid passing through the curved passage 320 may flow to the linear passage 310 through the connection passage 330.

For example, the elastic member 500 may be provided as a coil spring that gradually increases in diameter from one side thereof coming into contact with the lower end of the ceramic heater 100 to the other side thereof coming into contact with the lower cap 230, and the one side 510 of the elastic member 500 may be accommodated in the hollow of the ceramic heater 100. Also, the other side of the elastic member 500 may be equal or similar to an inner diameter of the main body 210.

Thus, one side of the elastic member 500 may be fitted into and fixe to the hollow of the ceramic heater 100, and the other side of the elastic member 500 may come into contact with and be supported by the main body 210 and the lower cap 230 so that the elastic member does not move. Therefore, the elastic member may be maintained between the lower end of the ceramic heater 100 and the lower cap 230.

Also, a temperature sensor 600 detecting a temperature of the hot water may be disposed in the hollow of the ceramic heater 100.

In addition, the temperature sensor 600 may be disposed at various positions as long as the temperature sensor 600 is capable of measuring a temperature of the hot water discharged out of the housing 200 through the outlet hole 221.

Temperature information detected by the temperature sensor 600 is transmitted to the control part 700.

For example, the temperature sensor 600 may pass through the upper cap 220 and then be accommodated in the ceramic heater 100.

Also, a flange 610 placed on a top surface of the upper cap 220 may be disposed above the temperature sensor. Thus, the temperature sensor 600 may be more stably fixed to the upper cap 220.

Also, a sealing member 820 for preventing water from leaking may be inserted between a through-hole of the upper cap, through which the temperature sensor 600 passes, and the temperature sensor 600. For example, the sealing member 820 may be provided as an O-ring.

Thus, the control part 700 may receive temperature information of the hot water, which is detected by the temperature sensor 600, and control an output of the ceramic heater 100 according to the inputted temperature value.

Also, the control part 700 may receive flow rate information of the hot water, which is detected by flow rate sensors provided in the flow rate adjustment units 410 and 420, and control an output of the ceramic heater 100 according to the inputted flow rate value.

Thus, the control part 700 may receive temperature information of the hot water, which is detected by the temperature sensor 600, and adjust an opened degree of each of the flow rate adjustment units 410 and 420 according to the inputted temperature value.

For example, when the temperature of the hot water, which is detected by the temperature sensor 600, is less than a target temperature, the output of the ceramic heater 100 may increase, or the opened degree of each of the flow rate adjustment units 410 and 420 may decrease. That is, a flow rate of the raw water introduced into the housing 200 may be reduced.

For example, when the temperature of the hot water, which is detected by the temperature sensor 600, is greater than the target temperature, the output of the ceramic heater 100 may decrease, or the opened degree of each of the flow rate adjustment units 410 and 420 may increase. That is, a flow rate of the raw water introduced into the housing 200 may increase.

For another example, when the temperature of the hot water, which is detected by the temperature sensor 600, is equal to the target temperature, the output of the ceramic heater 100 and the opened degree of each of the flow rate adjustment units 410 and 420 may be constantly maintained.

Hereinafter, results of computational fluid dynamics (CFD) analysis for each fluid flow according to <Embodiment 1> and <Embodiment 2> in the hot water generation module for the water treatment apparatus according to an embodiment will be described.

Figure 8:
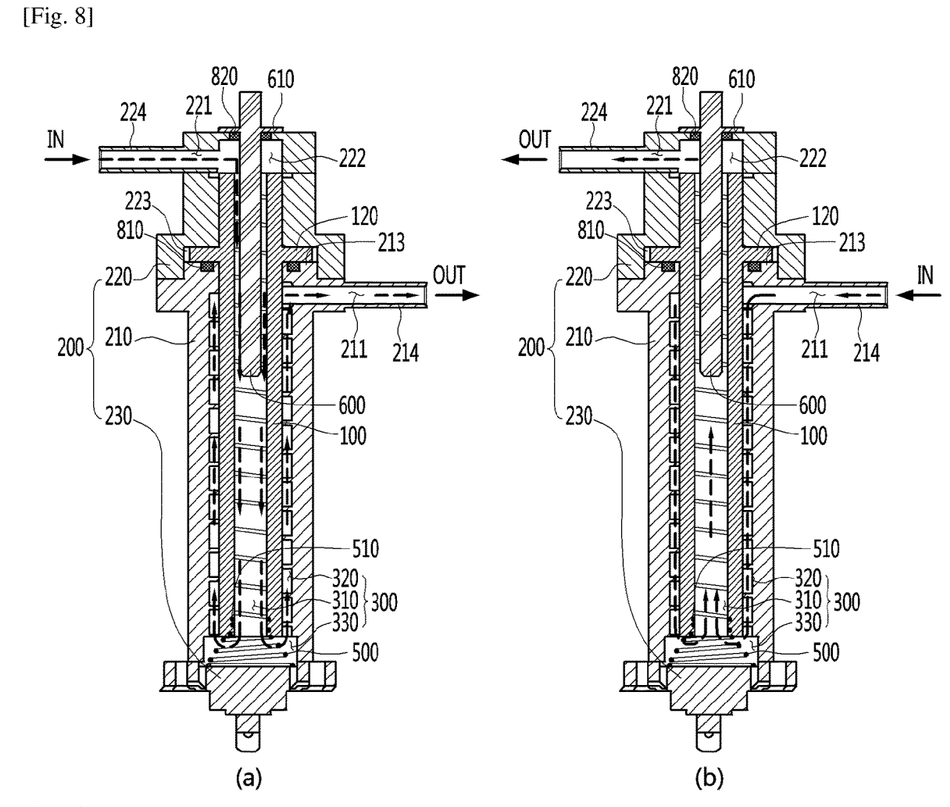
FIG. 8 is a cross-sectional view illustrating flow paths of two types of fluids in the hot water generation module for the water treatment apparatus of FIG. 7.
Figure 9:
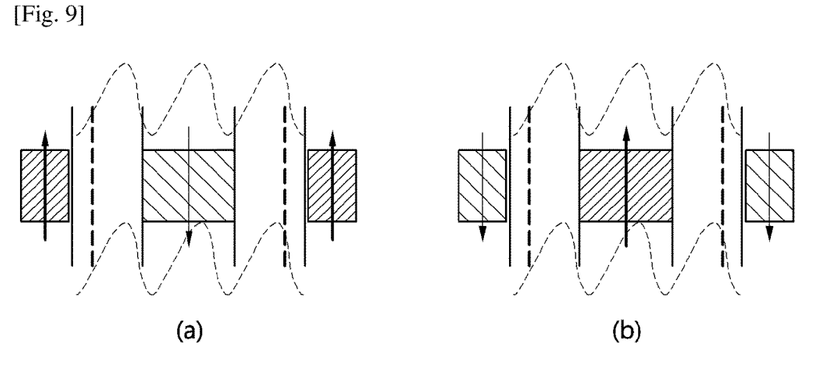
FIG. 9 is a schematic conceptual view illustrating the flow paths of the two types of fluids of FIG. 8.
Figure 10:
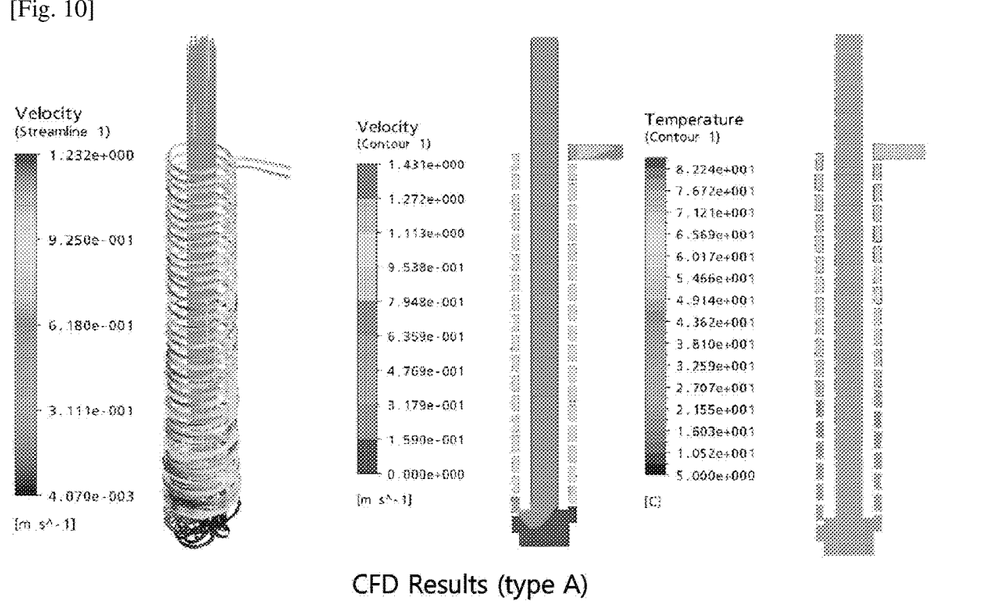
FIGS. 10 and 11 are views illustrating a CFD analysis result depending on the two types of fluid flow paths of FIG. 8.
Figure 11:
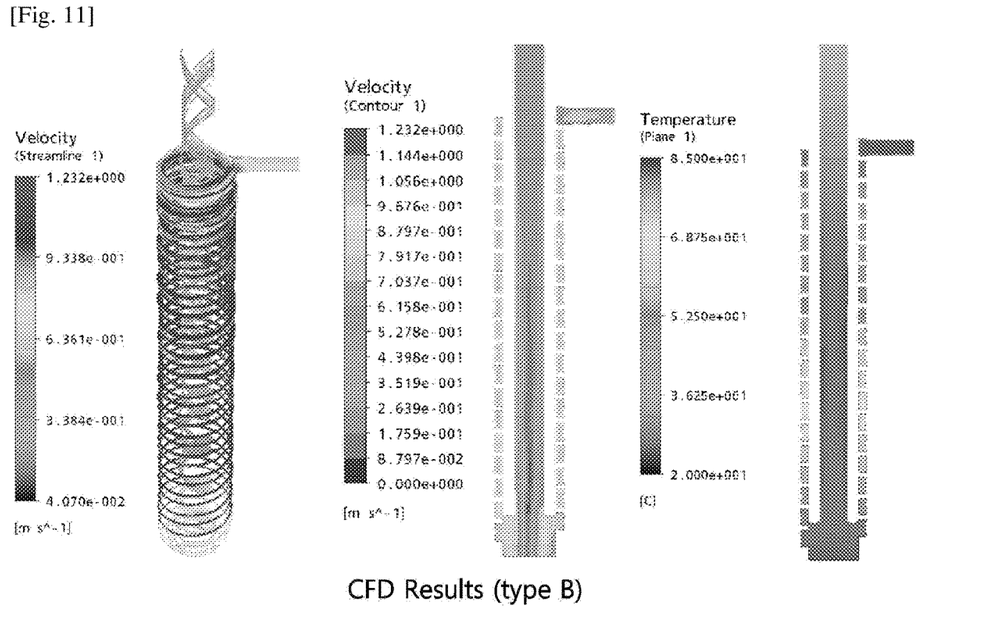

FIG. 8 is a cross-sectional view illustrating flow paths of two types of fluids in the hot water generation module for the water treatment apparatus of FIG. 7, FIG. 9 is a schematic conceptual view illustrating the flow paths of the two types of fluids of FIG. 8, and FIGS. 10 and 11 are views illustrating a CFD analysis result depending on the two types of fluid flow paths of FIG. 8.

Embodiment 1

As illustrated in FIGS. 8(a) and 9(a), a flow path of a fluid was set so that raw water is supplied to an outlet hole 221 communicating with a linear passage 310, and water is heated while flowing in order of the linear passage 310→a connection passage 330→a curved passage 320, and then the hot water is discharged through an inlet hole 211 communicating with the curved passage 320.

Embodiment 2

As illustrated in FIGS. 8(b) and 9(b), a flow path of a fluid was set so that raw water is supplied to an inlet hole 211 communicating with a curved passage 320, and water is heated while flowing in order of the curved passage 320→a connection passage 330→a linear passage 310, and then the hot water is discharged through an outlet hole 221 communicating with the linear passage 310.

As a result of CFD analysis of a fluid flow path according to two embodiments, in case of <Embodiment 2> illustrated in FIGS. 8(b) and 9(b), the more superior results were derived.

In detail, referring to FIGS. 10 and 11, it is confirmed that the results (see FIG. 11) of the CFD analysis of the fluid flow path according to <Embodiment 2> illustrated in FIGS. 9(b) and 9(b) are more stable and efficient in comparison to the results (see FIG. 10) of the CFD analysis of the fluid flow path according to <Embodiment 1> illustrated in FIGS. 8(a) and 9(a).

That is, it is confirmed that the raw water is received to the inlet hole 211 communicating with the curved passage 320, the kinetic energy that intends to rotate in the spiral shape due to inertia while passing through the curved passage 320 is accumulated when the introduced raw water passes first through the curved passage 320, the rotating flow is formed in the spiral shape when passing through the linear passage 310 by the accumulated kinetic energy, the high-temperature hot water is uniformly mixed in the linear passage 310, the hot water having the uniform temperature is dispensed, the fluidity is improved to prevent the flow stagnant section from occurring, and the high-temperature hot water is stably dispensed without causing the boiling phenomenon.

In summary of the CFD analysis results as described above, it is confirmed that the raw water introduced into the housing 200 is improved in fluidity while passing through the spiral heating passage 300.

Particularly, when the raw water passes first through the curved passage 320 and then passes through the linear passage 310, it is confirmed that the fluidity, the stability, and the uniformity are more improved.

According to the embodiments, since the flow stagnant phenomenon does not occur while the raw water is heated, the hot water having a high temperature may be generated to easily dispense the hot water having about 85° C. or more.

Also, since the flow stagnant phenomenon does not occur, the water boiling phenomenon may be solved to secure the safety.

Also, since the flow stagnant phenomenon is improved as described above, the raw water may be smoothly supplied, and thus the outlet water flow rate of hot water supplied to the outside may increase.

Also, since the fluid is mixed while flowing in the spiral shape in the high-temperature low-velocity flow space defined in an outlet hole side through which the hot water having a high temperature is discharged, the hot water having a uniform temperature may be supplied to the outside.

Also, the hot water having a high temperature may pass through the central portion of the ceramic heater to minimize the heat loss due to the heat dissipation.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A hot liquid generation module for a liquid treatment apparatus, comprising:
   a ceramic heater in which at least one heating wire is disposed and which has a hollow tube shape;
   a housing disposed to surround the outside of the ceramic heater; and
   a heating passage of which at least a portion is disposed in the housing to surround an outer circumferential surface of the ceramic heater in a spiral shape and in which raw liquid introduced into the housing is discharged to the outside of the housing after heating the raw liquid to generate hot liquid by coming into contact with the ceramic heater,
   wherein the housing includes:
   a main body which has opened sides and a hollow therein;
   an upper cap covering a first one of the opened sides of the main body; and
   a lower cap covering a second one of opened sides of the main body, and
   wherein an elastic member is provided between the ceramic heater and the lower cap.

2. The hot liquid generation module according to claim 1, wherein the heating passage comprises:
   a linear passage provided in a hollow shape inside the ceramic heater;
   a curved passage provided in a spiral shape on an outer surface of the ceramic heater; and a connection passage connecting the linear passage to the curved passage at an end of the ceramic heater.

3. The hot liquid generation module according to claim 2, wherein an inlet hole communicating with the curved passage to transfer the raw liquid supplied from the outside to the curved passage is defined in an upper end of one side of the housing.

4. The hot liquid generation module according to claim 3, wherein the inlet hole is defined in a tangential direction of the curved passage.

5. The hot liquid generation module according to claim 2, wherein an outlet hole communicating with the linear passage and discharging the hot liquid, which is heated while coming into contact with the ceramic heater, to the outside is defined in an upper end of one side of the housing.

6. The hot liquid generation module according to claim 5, wherein the outlet hole is defined above the inlet hole.

7. The hot liquid generation module according to claim 5, wherein the outlet hole is defined in parallel to the inlet hole.

8. The hot liquid generation module according to claim 5, further comprising a flow rate adjustment unit adjusting a flow rate of the raw liquid introduced into the inlet hole or adjusting a flow rate of the hot liquid discharged through the outlet hole.

9. The hot liquid generation module according to claim 2, wherein the main body includes an inwardly recessed groove part that is defined in a spiral shape, and
wherein the upper cap has an outlet hole through which a linear passage communicates with the outside.

10. The hot liquid generation module according to claim 1, wherein a flange part protruding outward along a circumference of the ceramic heater is disposed on one side of the ceramic heater, and the flange part is fixed between the main body and the upper cap.

11. The hot liquid generation module according to claim 1, wherein the elastic member comprises a coil spring that gradually increases in diameter from one side thereof coming into contact with the lower end of the ceramic heater to the other side thereof coming into contact with the lower cap, and the one side of the elastic member is accommodated in the hollow of the ceramic heater.

12. The hot liquid generation module according to claim 1, wherein the main body is manufactured in an injection molding manner.

13. The hot liquid generation module according to claim 1, wherein a temperature sensor detecting a temperature of the hot liquid is disposed in a hollow of the ceramic heater.

14. The hot liquid generation module according to claim 13, further comprising a control part receiving the temperature of the hot liquid, which is detected by the temperature sensor, and controlling an output of the ceramic heater.

15. A hot liquid generation module for a liquid treatment apparatus, comprising:
a ceramic heater in which at least one heating wire is disposed and which has a hollow tube shape;
a housing disposed to surround the outside of the ceramic heater; and
a heating passage of which at least a portion is disposed in the housing to surround an outer circumferential surface of the ceramic heater in a spiral shape and in which raw liquid introduced into the housing is discharged to the outside of the housing after heating the raw liquid to generate hot liquid by coming into contact with the ceramic heater,
wherein the heating passage includes:
a linear passage provided in a hollow shape inside the ceramic heater;
a curved passage provided in a spiral shape on an outer surface of the ceramic heater; and
a connection passage connecting the linear passage to the curved passage at an end of the ceramic heater, and
wherein the housing includes:
a main body which has both opened sides and a hollow therein and in which an inwardly recessed groove part is defined in a spiral shape;
an upper cap covering the opened one side of the main body and having an outlet hole through which a linear passage communicates with the outside; and
a lower cap covering the other opened side of the main body, and
wherein a flange part protruding outward along a circumference of the ceramic heater is disposed on one side of the ceramic heater, and the flange part is fixed between the main body and the upper cap.

* * * * *